(12) United States Patent
Sodhi et al.

(10) Patent No.: US 12,332,723 B2
(45) Date of Patent: *Jun. 17, 2025

(54) BLOCKING LATENCY EVENTS IN MULTI-DIE ARCHITECTURE

(71) Applicant: Apple Inc., Cupertino, CA (US)

(72) Inventors: Inder M. Sodhi, Palo Alto, CA (US); Achmed R. Zahir, Menlo Park, CA (US); Lior Zimet, Kerem Maharal (IL); Liran Fishel, Raanana (IL); Omri Flint, Ramat Hasharon (IL); Ami Schwartzman, Kfar-Sava (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,665

(22) Filed: Feb. 12, 2024

(65) Prior Publication Data

US 2024/0184355 A1 Jun. 6, 2024

Related U.S. Application Data

(63) Continuation of application No. 17/933,168, filed on Sep. 19, 2022, now Pat. No. 11,899,523, which is a
(Continued)

(51) Int. Cl.
*G06F 1/00* (2006.01)
*G06F 1/3206* (2019.01)
*G06F 1/3296* (2019.01)

(52) U.S. Cl.
CPC .......... *G06F 1/3296* (2013.01); *G06F 1/3206* (2013.01)

(58) Field of Classification Search
CPC ...... G06F 1/3296; G06F 1/3206; G06F 1/322; Y02D 10/00
See application file for complete search history.

(56) References Cited

U.S. PATENT DOCUMENTS

| 8,362,642 | B2 | 1/2013 | Zerbe et al. |
| 8,799,697 | B2 | 8/2014 | Johnson et al. |

(Continued)

FOREIGN PATENT DOCUMENTS

| CN | 111512266 A | 8/2020 |
| KR | 10-2017-0034423 A | 3/2017 |

(Continued)

OTHER PUBLICATIONS

Office Action in Korean Appl. No. 10-2023-7042331 mailed Feb. 19, 2024, 11 pages.
(Continued)

*Primary Examiner* — Nitin C Patel
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that pertain to synchronizing power states between integrated circuit dies. A system includes an integrated circuit that includes a plurality of integrated circuit dies coupled together. A particular integrated circuit die may include a primary power manager circuit and one or more remaining integrated circuit dies include respective secondary power manager circuits. The primary power manager circuit is configured to issue a transition request to the secondary power manager circuits to transition their integrated circuit dies from a first power state to a second power state. A given secondary power manager circuit is configured to receive the transition request, transition its integrated circuit die to the second power state, and issue an acknowledgement to the primary power manager circuit that its integrated circuit die has been transitioned to the second power state. Techniques are further disclosed relating to managing latency tolerance events within a multi-die integrated circuit.

20 Claims, 8 Drawing Sheets

Related U.S. Application Data continuation of application No. 17/340,940, filed on Jun. 7, 2021, now Pat. No. 11,467,655.

(56) References Cited

U.S. PATENT DOCUMENTS

| | | |
|---|---|---|
| 8,826,047 B1 | 9/2014 | Zhu et al. |
| 8,924,758 B2 | 12/2014 | Steinman et al. |
| 9,158,363 B2 | 10/2015 | Han et al. |
| 2010/0091537 A1 | 4/2010 | Best et al. |
| 2012/0146706 A1 | 6/2012 | Zheng et al. |
| 2014/0098617 A1 | 4/2014 | Jones et al. |
| 2014/0365796 A1 | 12/2014 | Han et al. |
| 2015/0006923 A1 | 1/2015 | Cooper et al. |
| 2015/0012681 A1 | 1/2015 | Lakshmanamurthy et al. |
| 2016/0026234 A1 | 1/2016 | Machnicki et al. |
| 2020/0241879 A1 | 7/2020 | Vorbach et al. |

FOREIGN PATENT DOCUMENTS

| | | | |
|---|---|---|---|
| KR | 10-2019-0073273 A | | 6/2019 |
| TW | 201913290 A | | 4/2019 |
| WO | 2013/048960 A1 | | 4/2013 |

OTHER PUBLICATIONS

Office Action in German Appl. No. 11 2022 002 956.0 mailed Mar. 25, 2024, 3 pages.
Office Action in Chinese Appl. No. 202280040409.9 mailed May 25, 2024, 4 pages.
International Search Report and Written Opinion in PCT Appl. No. PCT/US2022/032176 mailed Sep. 28, 2022, 10 pages.
Office Action in Taiwanese Appl. No. 111120785 mailed Feb. 20, 2023, 8 pages.

US 12,332,723 B2

BLOCKING LATENCY EVENTS IN MULTI-DIE ARCHITECTURE

PRIORITY

The present application is a continuation of U.S. application Ser. No. 17/933,168, entitled "SYNCHRONIZING POWER STATE CHANGES BETWEEN MULTIPLE DIES," filed Sep. 19, 2022 (now U.S. Pat. No. 11,899,523), which is a continuation of U.S. application Ser. No. 17/340,940, entitled "Multi-Die Power Synchronization," filed Jun. 7, 2021 (now U.S. Pat. No. 11,467,655), the disclosures of which are incorporated by reference herein in their entirety.

BACKGROUND

Technical Field

This disclosure relates generally to an integrated circuit and, more specifically, to the synchronizing of power states between multiple integrated circuit dies.

Description of the Related Art

Modern computer systems often include a system on a chip (SOC) that integrates many computer components into a single integrated circuit die. These components can include, for example, a central processing unit, a graphics processing unit, memory, input/output ports, and a secondary storage. Another computer component that can be included on an SOC is a power management circuit that provides various power-related functions, such as voltage conversion and regulation, battery charging, and power-rail management. The power management circuit controls the power that is provided to the other components within the SOC, such as the central processing unit.

SUMMARY

Various embodiments relating to synchronizing power states between integrated circuit dies are disclosed. An integrated circuit assembly is disclosed that comprises multiple integrated circuit dies that are coupled together. One of those integrated circuit dies includes an "active" primary power manager and a secondary power manager. The remaining integrated circuit dies include secondary power managers—they can include circuitry for a primary power manager, but only one of the primary power managers of the integrated circuit dies may be used (active). During operation, the primary power manager may determine (e.g., based on a request) to transition the integrated circuit dies from a first power state to a second, different power state. Consequently, the primary power manager may issue a transition request to the secondary power managers to transition their corresponding integrated circuit dies to the second power state. The secondary power managers may receive the transition request, transition their integrated circuit die to the second power state, and provide an acknowledgement to the primary power manager that their integrated circuit die has been transitioned to the second power state.

DETAILED DESCRIPTION

Figure 1:
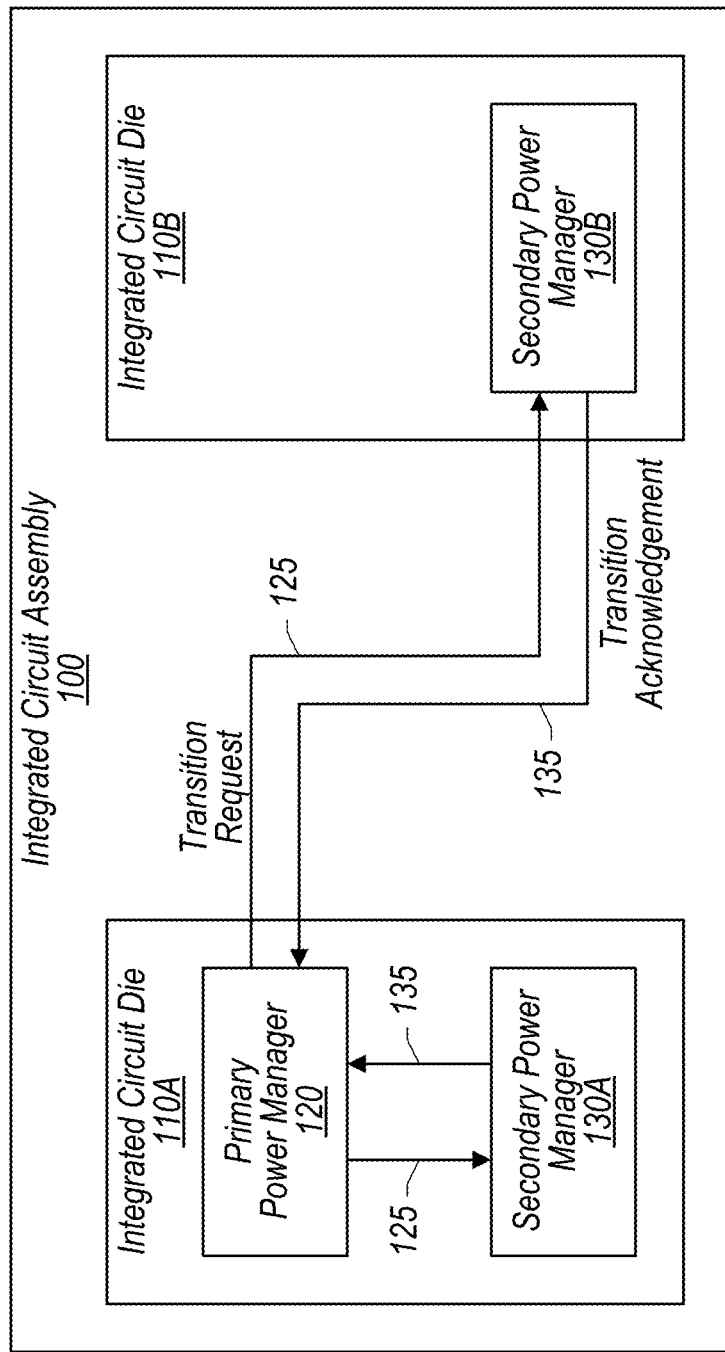
FIG. 1 is a block diagram illustrating example elements of an integrated circuit assembly having multiple integrated circuit dies, according to some embodiments.

This present disclosure describes embodiments in which an integrated circuit assembly comprises multiple integrated circuit dies instead of a single integrated circuit die that is commonly found in computer systems. In a multi-die setup, however, issues can arise when cooperation between the dies is pertinent to the completion of a task, but the dies act independently with respect to their power states. For example, if a die independently enters a low power state right before an agent (e.g., a peripheral) of another die issues an access request to a memory associated with the former die, then the processing of the access request may be considerably delayed, affecting the performance of the agent. As such, unsynchronized power management between multiple integrated circuit dies can cause system performance issues. It may be desirable to ensure that the multiple dies operate as one logical "SOC" (at least from a power viewpoint) so that interactions involving multiple dies are not unduly affected. This disclosure addresses, among other things, these technical problems relating to power management in a multi-die integrated circuit assembly.

This disclosure describes techniques for synchronizing power state transitions between multiple integrated circuit dies. In various embodiments described below, a system comprises multiple integrated circuit dies coupled together. One of the circuit dies includes an active primary power manager (PMGR) and the remaining circuit dies each include a secondary PMGR. The die having the primary PMGR may include a secondary PMGR as well. In various embodiments, the primary PMGR orchestrates power state changes to the dies and ensures that the power states on all the dies are synchronized to the same power state. When a power state change is to occur, the primary PMGR may send a transition request to the secondary PMGRs to transition their corresponding circuit dies from a first power state to a second, different power state. The secondary PMGRs begin a power sequence to transition their circuit dies to the second power state and once there, they send back an acknowledgement to the primary PMGR that their die has been transitioned. In some embodiments, transitioning between two power states can involve multiple synchronization points between the two power states. The above request-and-acknowledgement procedure may be also used to move through the synchronization points such that the secondary PMGRs transition their dies to a particular synchronization point, acknowledge the transition to the primary PMGR, and then proceed to the next synchronization point once they receive a request from the primary PMGR to proceed.

This disclosure further describes techniques for managing latency tolerance events in a multi-die integrated circuit. Latency events can occur that cause memory unavailability/high latency—e.g., a latency event may involve changing a frequency of a memory. To avoid issues caused by the unavailability of a system component, agents (e.g., a peripheral) may ensure that their buffers have enough space/data to survive the periods of unavailability without overflow or underrun. When a latency event is detected, in various embodiments, the primary PMGR broadcasts minimum read and write tolerance values to the secondary PMGRs. The secondary PMGRS may notify the appropriate agents associated with their dies so that those agents can increase their latency tolerance. The primary PMGR may delay/block the event until all agents, in all dies, are able to tolerate the target latency.

The disclosed techniques may be advantageous as they can prevent problems that result from unsynchronized power states within a multi-die integrated circuit. Returning to the earlier example of the agent sending an access request to another die that is powering down, using the disclosed techniques, the other die can be prevented from powering down. As such, the access request can be processed without causing a performance loss to the agent that would result from unsynchronized power states. The disclosed techniques may also be advantageous as they can prevent problems that result from the unavailability of a component during certain events (e.g., a memory that is unavailable during a frequency change to the memory). As an example, if an agent is not prepared for a latency event pertaining to a memory, then the agent may not cache enough data locally to survive that event without an issue. But using the disclosed techniques, the agent can be made aware such that the agent can increase the amount of data cached locally to last the event without the memory. An example application of these techniques will now be discussed, starting with reference to FIG. 1.

Turning now to FIG. 1, a block diagram of an integrated circuit assembly 100 is illustrated. In the illustrated embodiment, integrated circuit assembly 100 includes integrated circuit dies 110A and 110B that are coupled together. While two integrated circuit dies 110 are depicted, integrated circuit assembly 100 may include more integrated circuit dies 110 (e.g., four integrated circuit dies 110) coupled together. As further illustrated, integrated circuit die 110A includes a primary power manager (primary PMGR) 120 and a secondary PMGR 130A, and integrated circuit die 110B includes a secondary PMGR 130B. While integrated circuit die 110B is not shown as having a primary PMGR 120, in some embodiments, it includes a primary PMGR 120 but that primary PMGR 120 is not actively coordinating power transitions—that is, integrated circuit dies 110 may each include the same power management circuitry, but only one of those dies may have an active primary PMGR 120.

Integrated circuit assembly 100, in various embodiments, is a set of components that is integrated onto a single semiconductor substrate as an integrated circuit "chip." In many cases, integrated circuit assembly 100 may be a system on a chip (SOC), which as the name suggests, integrates many components of a computing device (e.g., a central processing unit (CPU), a graphics processing unit (GPU), I/O devices, memory, etc.) onto a single chip. As depicted, integrated circuit assembly 100 includes two distinctive integrated circuit dies 110A-B coupled together. Integrated circuit dies 110A-B, in various embodiments, are component packages of integrated circuit assembly 100 that each integrate one or more of the same type of components (e.g., CPU). In some cases, integrated circuit dies 110A-B may be the same set of hardware components (e.g., CPU, GPU, etc.) printed on each chip. In various embodiments, integrated circuit dies 110A-B are configured as a single system in which the existence of multiple dies is transparent to software executing on the single system—that is, integrated circuit assembly 100 may be a multi-die system in which the hardware hides the fact that there are multiple dies from software (e.g., by ensuring latencies are low, keeping power states synchronized, etc.). Accordingly, as explained further below, primary PMGR 120 may ensure that integrated circuit assembly 100 exhibits a unified power state by ensuring that the power states on integrated circuit dies 110A-B dies are synchronized to the same power state.

Primary power manager 120, in various embodiments, is circuitry that is configured to manage and coordinate power state transitions among integrated circuit dies 110. A power state transition of integrated circuit assembly 100 may be performed in response to the occurrence of various events, such as the reception of a wake-up request to transition to an awake state. Accordingly, in response to a detection of the occurrence of those events, in various embodiments, primary PMGR 120 instructs, via a transition request 125, secondary PMGRs 130A-B to transition their dies 110A-B to another power state. In some cases, primary PMGR 120 may issue a transition request 125 by asserting a request signal that is coupled to secondary PMGRs 130A-B. After an integrated circuit die 110 has been transitioned to the other power state, primary PMGR 120 may receive a transition acknowledgement 135 from the associated secondary PMGR 130 that acknowledges the completion of that power state transition. That transition acknowledgement 135 may be received via an assertion of an acknowledgement signal coupled to primary PMGR 120.

In some embodiments, primary PMGR 120 ensures that at least a threshold number of dies 110 (e.g., all of them) have transitioned to a power state before then starting to transition to another power state by waiting for acknowledgements 135 from a corresponding threshold number of secondary PMGRs 130. That is, when transitioning through a series of different power states, primary PMGR 120 may ensure that integrated circuit dies 110 have reached a given power state before starting to transition them to the next power state. As discussed in greater detail with respect to FIG. 3B, primary PMGR 120 may transition integrated circuit dies 110 through one or more synchronization points between two power states. As discussed in greater detail with respect to FIG. 5, primary PMGR 120 may also manage and coordinate the handling of latency tolerance events.

Secondary PMGRs 130, in various embodiments, are circuitry configured to transition a corresponding die 110 between power states. The power state being transitioned to (which is often referred to herein as the "target state" of the transition) may be identified by PMGRs 130 in different ways. In various cases, a transition request 125 may indicate the target state, or primary PMGR 120 may set one or more registers that are associated with a secondary PMGR 130 to indicate the target state. But in some cases, secondary PMGRs 130 might determine the target state based on a power state machine without being explicitly being told the target state by primary PMGR 120. For example, the power state machine may be such that, when in an off state, integrated circuit assembly 100 can transition to only an awake state. Thus, if integrated circuit assembly 100 is in the off state and a secondary PMGR 130 receives a transition request 125 to transition its integrated circuit die 110, then the secondary PMGR 130 transitions its integrated circuit die 110 to the awake state according to the power state machine without being told that the awake state is the target state. An example power state machine is discussed in greater detail with respect to FIG. 3A. As mentioned, once its die 110 has reached the targeted power state, a secondary PMGR 130 may provide back a transition acknowledgment 135 to primary PMGR 120.

Figure 2:
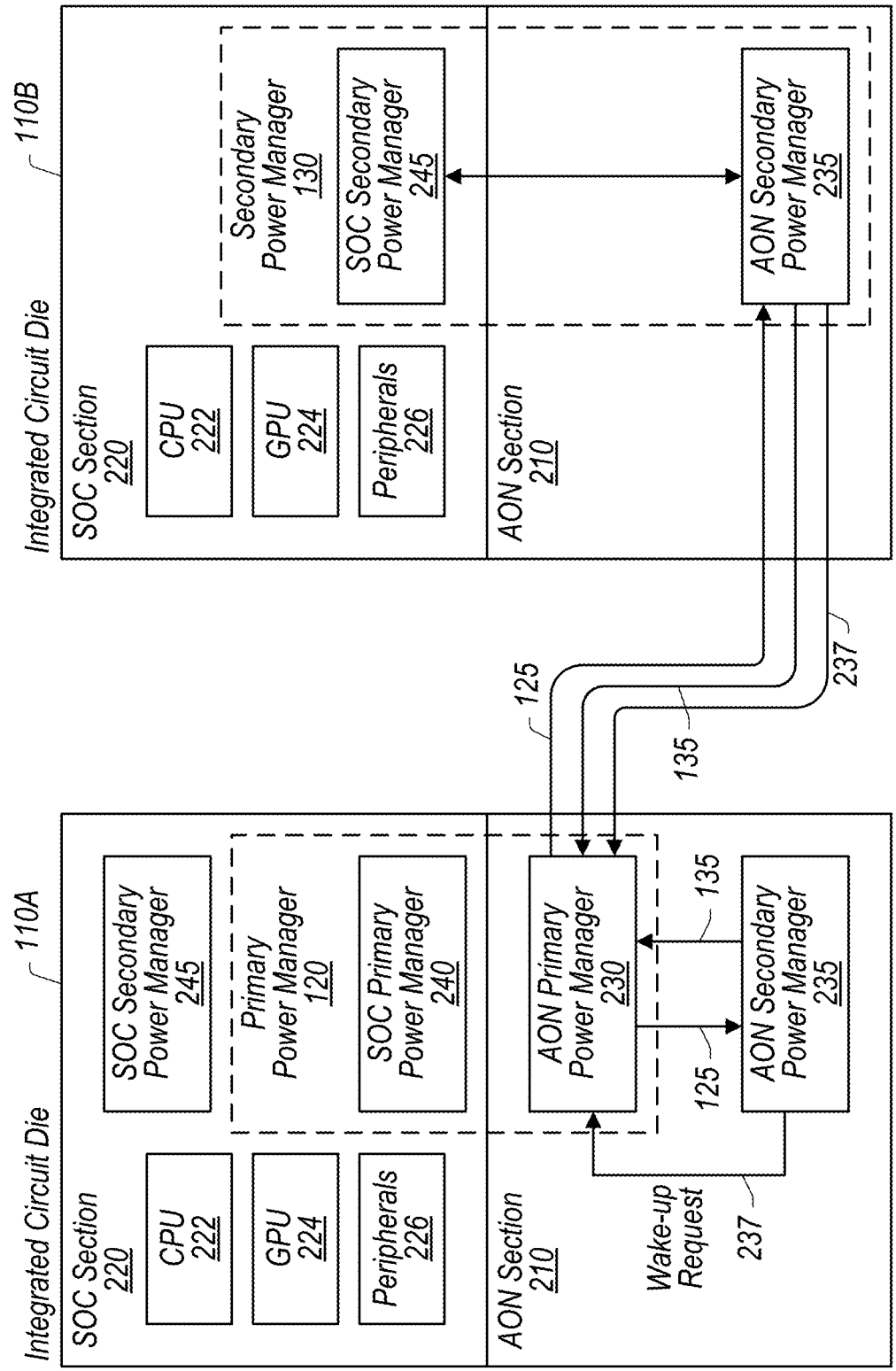
FIG. 2 is a block diagram illustrating example elements of integrated circuit dies having an SOC section and an always-on (AON) section, according to some embodiments.

Turning now to FIG. 2, a block diagram of example elements of integrated circuit dies 110 is illustrated. In the illustrated embodiment, integrated circuit dies 110 each comprise an AON section 210 and an SOC section 220. As depicted, AON section 210 of integrated circuit die 110A includes an AON primary PMGR 230 (which is a portion of primary PMGR 120), and an AON secondary PMGR 235 (which is a portion of the secondary PMGR 130 of die 110A). SOC section 220 of integrated circuit die 110A includes a CPU 222, a GPU 224, peripherals 226, an SOC primary PMGR 240 (which is a portion of primary PMGR 120), and an SOC secondary PMGR 245 (which is a portion of the secondary PMGR 130 of integrated circuit die 110A). Also as depicted, AON section 210 of integrated circuit die 100B includes an AON secondary PMGR 235 (which is a portion of the secondary PMGR 130 of integrated circuit die 110B). SOC section 220 of integrated circuit die 110B includes a CPU 222, a GPU 224, peripherals 226, and an SOC secondary PMGR 245 (which is a portion of the secondary PMGR 130 of integrated circuit die 110B). In some embodiments, integrated circuit dies 110 are implemented differently than shown. As an example, integrated circuit dies 110 may not include a GPU 224, peripherals 226 may be external to dies 110, etc.

An always-on (AON) section 210, in various embodiments, is a section of an integrated circuit die 110 that remains powered on as long as that integrated circuit die 110 continues to receive power. Particularly, a computing device having integrated circuit assembly 100 may also include a power management unit that comprises circuitry configured to generate supply voltages and to provide those supply voltages to the components of the computing device, such as integrated circuit dies 110A-B. Accordingly, an AON section 210 is "always-on" in the sense that it may be powered if its integrated circuit die 110 is receiving any power (including times when the computing device is in standby mode or is operating actively), but may not be powered when its integrated circuit die 110 is not receiving any power, such as when the computing device is completely turned off. In contrast, an SOC section 220, in various embodiments, is a section that can be powered off to reduce and conserve power, even when its integrated circuit die 110 continues to receive power. As an example, CPUs 222, GPUS 224, or peripherals 226 may be powered off while not being used. In various embodiments, the AON section 210 and the SOC section 220 of an integrated circuit die 110 are part of separate power domains configured to receive supply voltage (i.e. be powered on) or not receive supply voltage (i.e. be powered off) independent of other power domains.

A central processing unit (CPU) 222, in various embodiments, includes circuitry that is configured to retrieve and execute program instructions to implement software routines, such as an operating system. A CPU 222 may retrieve, from a memory via an interconnect, program instructions that are associated with a computer process and store those program instructions in entries of an instruction cache of a CPU 222. As a CPU 222 proceeds through the execution path of a computer process, a processor core of a CPU 222 may retrieve program instructions from the instruction cache and execute them in an execution complex. The execution complex may include hardware components, such as a control unit, an arithmetic logic unit, registers, etc., that facilitate the execution of program instructions. A CPU 222 may include any suitable number of processor cores (e.g., four cores, eight cores, etc.) and may also communicate, via the interconnect, with other components (e.g., a system memory, a GPU 224, peripherals 226, etc.). A graphics processing unit (GPU) 224, in various embodiments, includes circuitry configured to facilitate the rendering of graphics and the performance other types of operations that involve certain types of mathematical operations (e.g., matrix operations).

Peripherals 226, in various embodiments, include any desired circuitry, depending on the type of the system that includes integrated circuit assembly 100. For example, in one embodiment, the system may be a mobile device (e.g. personal digital assistant (PDA), smart phone, etc.) and peripherals 226 may include devices for various types of wireless communication, such as Wi-Fi, Bluetooth, cellular, global positioning system, etc. Peripherals 226 may also include additional storage, including RAM storage, solid state storage, or disk storage. Peripherals 226 may include user interface devices such as a display screen, including touch display screens or multitouch display screens, keyboard or other input devices, microphones, speakers, etc. In other embodiments, the system may be any type of computing system (e.g. desktop personal computer, laptop, workstation, net top etc.).

As shown, primary PMGR 120 comprises an AON primary PMGR 230 located in the AON section 210 of die 110A and an SOC primary PMGR 240 located in the SOC section 220 of die 110A. AON primary PMGR 230, in various embodiments, is circuitry that is configured to orchestrate power states of dies 110. Since one or more states exist in which the SOC section 220 is powered off while the AOC section 210 is powered on, AON primary PMGR 230 may reside within the AOC section 210 so that it can orchestrate power state transitions during those states. SOC primary PMGR 240, in various embodiments, is circuitry configured to orchestrate performance-related adjustments of components in dies 110. Consider an example in which a frequency of a memory is to be adjusted, causing the memory to become unavailable while the adjustment is made. Consequently, SOC primary PMGR 240 may ensure that the components in dies 110 are prepared for that unavailability of the memory. This is discussed in more detail with respect to FIG. 5.

As further shown, the AON sections 210 include AON secondary PMGRs 235 and the SOC sections 220 include SOC secondary PMGRs 245. While AON primary PMGR 230 may orchestrate power state transitions for integrated circuit assembly 100, AON secondary PMGRs 235, in various embodiments, implement those power state transitions for their dies 110. For example, one of the AON secondary PMGRs 235 may determine that dies 110 should be woken up based on receiving a wake-up indication (e.g., a signal driven by a component of AON sections 210, one or more wakeup registers being set by a program, etc.). Based on that determination, the AON secondary PMGR 235 issues a wake-up request 237 to AON primary PMGR 230 to wake up dies 110. Consequently, AON primary PMGR 230 may instruct AON secondary PMGRs 235 to transition their dies 110 to a target state (e.g., an awake state) and then AON secondary PMGRs 235 power up/down various components to reach that target state (e.g., power up SOC sections 220). Likewise, while SOC primary PMGR 240 may orchestrate performance-related adjustments for various components, SOC secondary PMGRs 245 actually prepare for and facilitate those adjustments. As such, SOC primary PMGR 240 may instruct SOC secondary PMGRs 245 to prepare for a latency event and SOC secondary PMGRs 245 may communicate with components on their dies 110 (e.g., peripherals 226) to ensure that those components can tolerate the latency event.

Figure 3B:
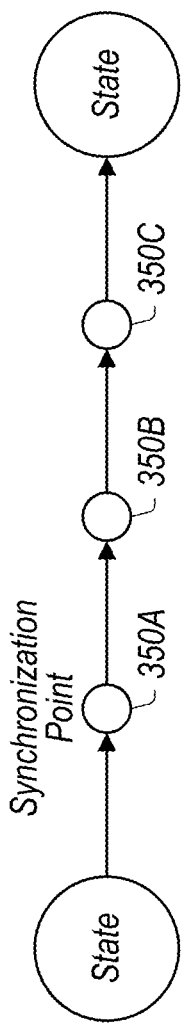
FIG. 3B is a block diagram illustrating example synchronization points that are between two different power states, according to some embodiments.
Figure 3A:
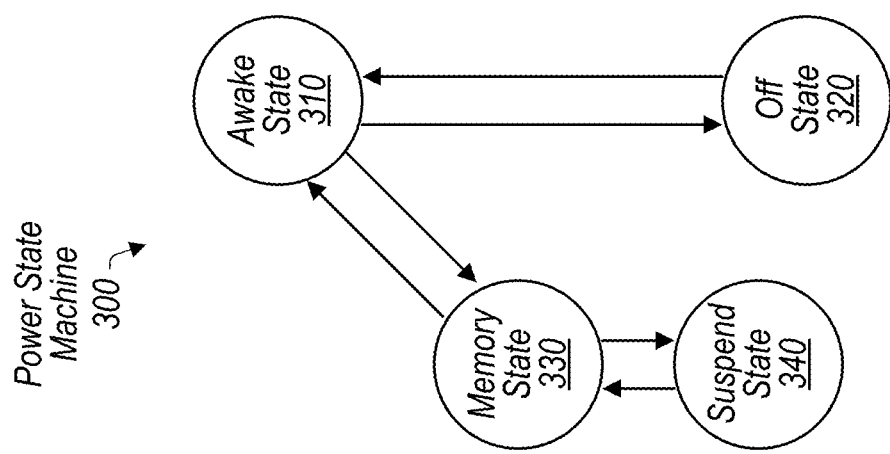
FIG. 3A is a block diagram illustrating example elements of a power state machine for an integrated circuit die, according to some embodiments.

Turning now to FIG. 3A, a block diagram of example elements of a power state machine 300 is illustrated. In the illustrated embodiment, power state machine 300 includes an awake state 310, an off state 320, a memory state 330, and a suspend state 340. In some embodiments, power state machine 300 is implemented differently than shown. For example, memory state 330 and suspend state 340 may be replaced with a single sleep state.

Power state machine 300, in various embodiments, facilitates the transition of a die 110 through different power states. Power state machine 300 may be implemented via hardcoded logic included in secondary PMGRs 130 (and in primary PMGRs 120, in some cases). Power state machine 300 may alternatively be implemented using circuitry that executes instructions (e.g., firmware or software instructions), or a combination of that circuitry and the hardcoded logic. As explained, die 110 transitions between power states are orchestrated and coordinated through AON primary PMGR 230. As a result, integrated circuit assembly 100's power state can be kept coherent throughout its integrated circuit dies 110 and transitions between power states can be done in lock-step with all dies 110 so that all dies 110 observe the same power state. In various embodiments, power state machine 300 enables AON secondary PMGR 235 to maintain their local dies 110 power states so that a coherent power state is maintained across integrated circuit assembly 100.

Awake state 310, in various embodiments, represents a state in which a corresponding die 110 is operating in a normal operating mode. In awake state 310, the primary input clocks and voltages of a die 110 are up and the memory (e.g., DRAM) in the die 110 may be functional and available. Furthermore, the die-to-die interface (discussed in greater detail with respect to FIG. 4) may be functional and available as well. As illustrated, awake state 310 can be entered from off state 320 and memory state 330. Integrated circuit assembly 100 may be transitioned into awake state 310 from off state 320 in response to the occurrence of power up event (e.g., a user may press the power button on the device). In response to the event, AON primary PMGR 230 may issue a transition request 125 to AON secondary PMGRs 235 to transition dies 110 to awake state 310. Integrated circuit assembly 100 may be transitioned into awake state 310 from memory state 330 in response a wake-up condition occurring in a die 110. For example, a wake-up signal may be asserted by an interrupt handler based on an interrupt. The AON secondary PMGR 235 that observed the assertion of the wake-up signal may send a wake-up request 237 to AON primary PMGR 230, which may orchestrate the transition to awake state 310.

Off state 320, in various embodiments, is a state in which there is no power supplied to integrated circuit assembly 100 or a memory (e.g., DRAM) coupled to integrated circuit assembly 100. Integrated circuit assembly 100 may be transitioned into off state 320 in response to the occurrence of an event that is triggered by a user. For example, a user may press the power button on their device to power it down or the user may issue a command through a user interface to power down their device. In response, AON primary PMGR 230 may issue a transition request 125 to AON secondary PMGRs 235 to transition dies 110 to off state 320.

Memory state 330 (or, "DRAM" state 330), in various embodiments, is a state in which the I/O voltages of dies 110 and corresponding memory (e.g., DRAM) are powered on. While those I/O voltages are powered on, the AON sections 210 of dies 110 may access the memory via an interconnect coupled to integrated circuit assembly 100 and the memory. As shown, memory state 330 can be entered from awake state 310 and suspend state 340. Integrated circuit assembly 100 may be transitioned into memory state 330 from awake state 310 when a set of the sleep conditions are met for components (e.g., CPU 222, GPU 224, etc.) of dies 110. Integrated circuit assembly 100 may be transitioned into memory state 330 from suspend state 340 when memory access is needed by components of the AON section 210 in at least one of the dies 110, or when integrated circuit assembly 100 is being woken up and memory state 330 acts as a transition state before entering awake state 310.

Suspend state 340, in various embodiments, is a state in which memory (e.g., DRAM) associated with dies 110 is in a memory self-refresh mode and the AON sections 210 of dies 110 are powered on, but the SOC sections 220 are powered off. While in suspend state 340, the memory may be unavailable for read and write operations as the memory is being refreshed. As such, the transition from memory state 330 to suspend state 340 may occur when memory access is not requested/required by the AON sections 210. In various embodiments, however, the AON sections 210 can still perform various functions, such as requesting the power rails for gaining access to the memory.

Turning now to FIG. 3B, a block diagram of synchronization points 350 between two states of power state machine 300 is illustrated. In the illustrated embodiment, there are three synchronization points 350. In some embodiments, there may be more or less synchronization points 350 between any two given power states of power state machine 300.

Synchronization points 350, in various embodiments, provide for more granular control over the transition from one power state to another power state. That is, synchronization points 350 may allow for primary PMGR 120 to keep the states of integrated circuit dies 110 more in lockstep. In various embodiments, when transitioning among power states, secondary PMGRs 130 follow a transaction script that includes a sequence of events, which may include hardware and software events. For example, events may include configuring registers in preparation for resuming execution, adjusting voltage levels supplied to various components, configuring die-to-die interfaces, etc. In some cases, the ordering of the hardware and software events within the transaction script may be changed without changing the hardware. In various embodiments, synchronization points 350 can be mapped to events in a transaction script such that, when an event is reached or completed, a secondary PMGR 130 can be halted from transitioning its die 110 further until the other secondary PMGR 130 have caught up.

When orchestrating the transition of integrated circuit assembly 100 into another power state, in various embodiments, primary PMGR 120 writes the intended synchronization point 350 (e.g., point 350A) to a register that is included in secondary PMGRs 130. Primary PMGR 120 may then issue a request (e.g., by asserting a signal) to secondary PMGRs 130 to begin transitioning their corresponding dies 110. Upon detecting the request, secondary PMGRs 130 may run the transaction script until the synchronization point 350 (e.g., point 350A) is reached. Secondary PMGRs 130 may each send an acknowledgement (e.g., by asserting a signal) to primary PMGR 120 upon reaching the synchronization point 350. The acknowledgement may indicate that the secondary PMGR 130 has halted execution and is waiting for a continue execution command from primary PMGR 120. Once acknowledgements from all secondary PMGRs 130 have been received, primary PMGR 120 writes the next synchronization point 350 (e.g., point 350B) to the register and issues another synchronization request to secondary PMGRs 130 to transition to that next synchronization point. In some cases, once secondary PMGRs 130 are at the same state, primary PMGR 120 may execute one or more commands that are intended to run once all secondary PMGRs 130 are at the same state. Upon detecting the request, secondary PMGRs 130 may proceed to transition their dies up to that next synchronization point (e.g., point 350B).

Figure 4:
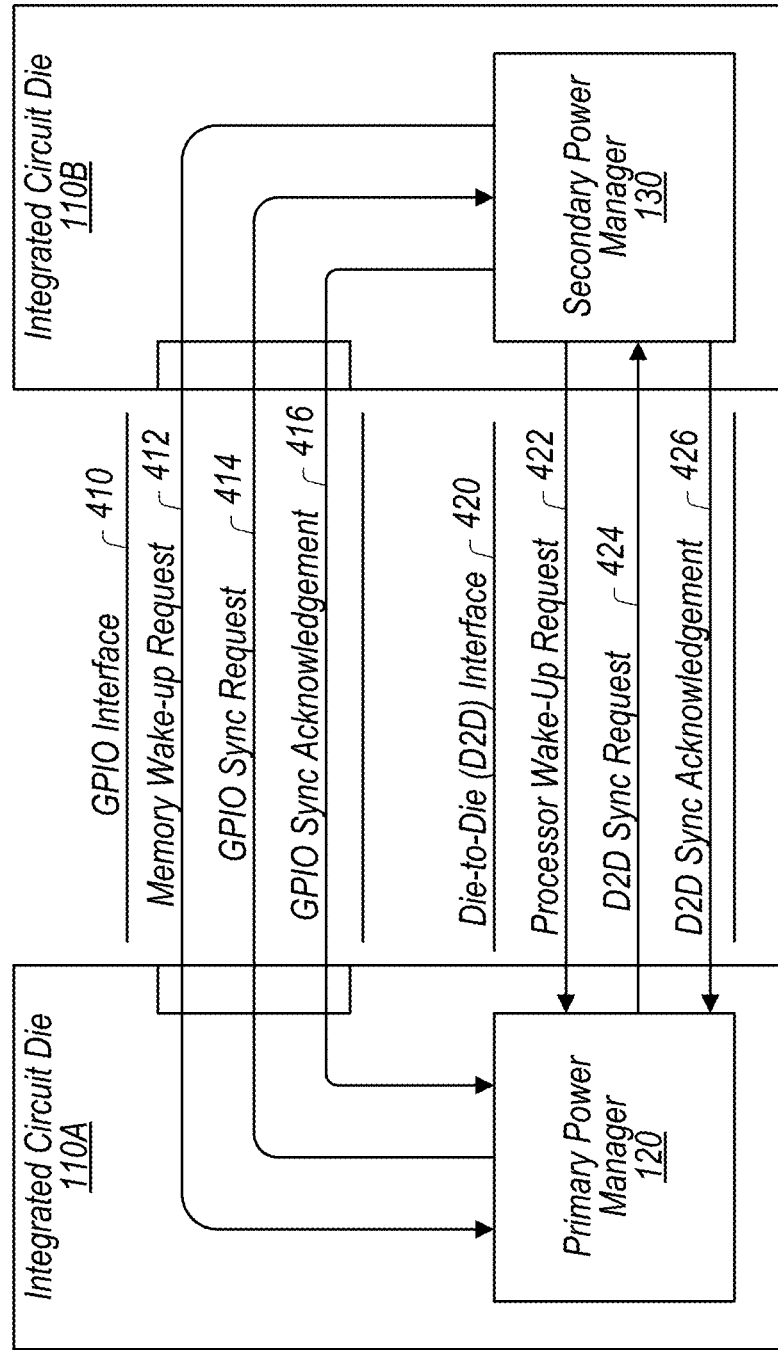
FIG. 4 is a block diagram illustrating example elements of a GPIO interface and a die-to-die interface, according to some embodiments.

Turning now to FIG. 4, a block diagram of example elements of interfaces that facilitate communication among integrated circuit dies 110 is illustrated. In the illustrated embodiment, there is a general purpose input/output (GPIO) interface 410 and a die-to-die interface 420. In some embodiments, integrated circuit dies 110 may interface differently. As an example, only GPIO interface 410 may be implemented.

GPIO interface 410, in various embodiments, is an interface between integrated circuit dies 110 that includes a set of signal pins on one die 110 that are connected to a corresponding set of signal pins on another die 110. The signal pins may be set up to accept or source different logic voltages and thus can be used to perform digital input and output functions. For example, secondary PMGR 130 of die 110B may use a signal pin of GPIO interface 410 to assert a signal that can be detected by primary PMGR 120, where that signal may be used to indicate a request or an acknowledgement. As shown, GPIO interface 410 can be used to send a memory wake-up request 412 and a GPIO synchronization acknowledgement 416 to primary PMGR 120 and to receive, at secondary PMGR 130, a GPIO synchronization request 414 from primary PMGR 120.

Die-to-die (D2D) interface 420, in various embodiments, extends networks and buses of dies 110 among dies 110 such that those networks and buses can function as a single unified fabric topology connecting dies 110 together. D2D interface 420 includes various signals that are asserted/driven by sender blocks on one die 110 and received by the corresponding receiver blocks on another die 110. As shown, D2D interface 420 can be used to send a processor wake-up request 422 and a D2D synchronization acknowledgement 426 to primary PMGR 120 and to receive, at secondary PMGR 130, a D2D synchronization request 424 from primary PMGR 120.

In some embodiments, D2D interface 420 is powered down and unavailable while dies 110 are in suspend state 340. As such, GPIO interface 410 may be used to communicate power state transition information (e.g., requests and acknowledgements) among dies 110 during that state. But GPIO interface 410 may be considered an unsecure form of communication and thus more susceptible to malicious attacks. In various embodiments, GPIO interface 410 is used to communicate transition information (e.g., in order to initiate the transition out of suspend state 340) until D2D interface 420 becomes available for PMGRs 120 and 130 to be able to switch over. In particular, during suspend state 340, an AON secondary PMGR 235 within one of the dies 110 may determine (e.g., based on an interrupt) that memory access is requested/needed by a component of its AON section 210 (or that integrated circuit assembly 100 should be woken up). In response, that AON secondary PMGR 235 may issue a memory wake-up request 412 to AON primary PMGR 230 via GPIO interface 410 (e.g., by asserting a signal across a pin of GPIO interface 410). After receiving that memory wake-up request 412, AON primary PMGR 230 may issue, via GPIO interface 410, a GPIO synchronization request 414 to that AON secondary PMGR 235. AON primary PMGR 230 may further issue a synchronization request to the AON secondary PMGR 235 within its own die 110. AON secondary PMGRs 235 may then transition their dies 110 up to a particular synchronization point 350 (e.g., the first synchronization point 350 on the path to memory state 330). Upon reaching that synchronization point 350, the AON secondary PMGR 235 of die 110B may issue, via GPIO interface 410, a GPIO synchronization acknowledgement 416 to AON primary PMGR 230.

In various embodiments, the particular synchronization point 350 is used for switching between GPIO interface 410 and D2D interface 420—D2D interface 420 is powered up by that synchronization point 350. After receiving the GPIO synchronization acknowledgement 416, AON primary PMGR 230 de-asserts its GPIO synchronization request 414 signal and the AON secondary PMGRs 235 de-assert their signals. Then, in various embodiments, AON primary PMGR 230 and the AON secondary PMGRs 235 switch to using D2D interface 420 such that subsequent communication is performed via D2D interface 420. The switch may be performed using a local configuration bit. Once the switch over to using D2D interface 420 has occurred, dies 110 may be permitted to proceed to memory state 330. AON primary PMGR 230 and the AON secondary PMGRs 235 may use D2D synchronization request 424 and acknowledgement 426 to move through synchronization points 350 involving memory state 330, awake state 310, and off state 320. AON secondary PMGRs 235 may also issue processor wake-up requests 422 (a type of wake-up request 237, which also includes memory wake-up request 412) using D2D interface 420.

A similar process is performed when transitioning from memory state 330 to suspend state 340. When transitioning to suspend state, AON primary PMGR 230 and AON secondary PMGRs 235 may communicate over D2D interface 420 until a particular synchronization point 350 is reached. Once that synchronization point 350 is reached, AON primary PMGR 230 and AON secondary PMGRs 235 may switch to communicating over GPIO interface 410 instead of over D2D interface 420. Once the switch has occurred, dies 110 may be permitted to proceed into suspend state 340.

Figure 5:
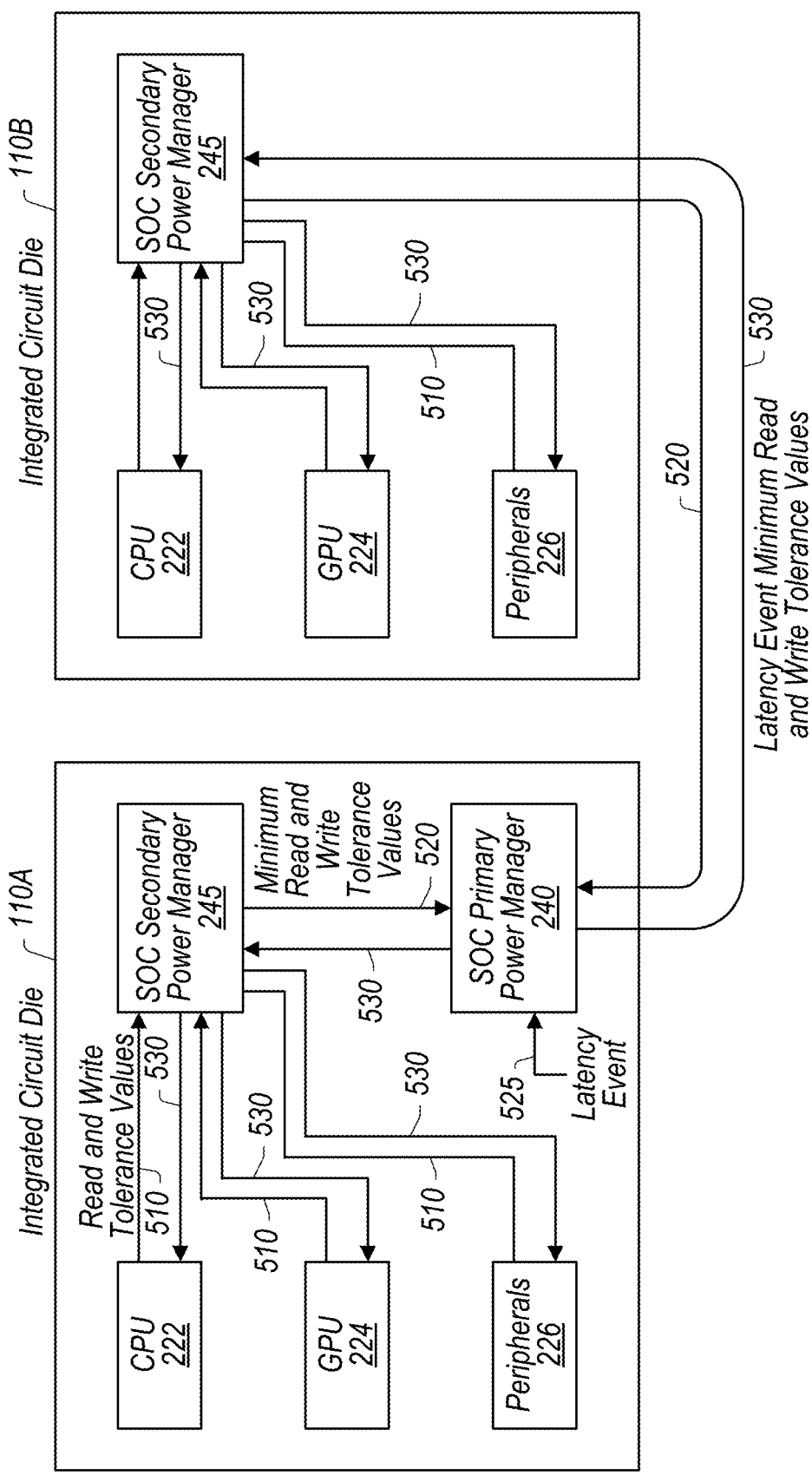
FIG. 5 is a block diagram illustrating example elements that pertain to handling a latency event, according to some embodiments.

Turning now to FIG. 5, a block diagram of example elements relating to a latency event 525 is illustrated. In the illustrated embodiment, integrated circuit dies 110A-B each include a CPU 222, a GPU 224, one or more peripherals 226, and an SOC secondary PMGR 245. Also as shown, integrated circuit die 110A includes an SOC primary PMGR 240. While not shown, AON primary PMGR 230 and AON secondary PMGRs 235 may be included in dies 110A-B. The illustrated embodiment may be implemented differently than shown. For example, CPUs 222 and GPUs 224 may not receive or provide read and write tolerance values. That is, in some cases, a latency event 525 may not concern CPUs 222 and GPUs 224.

As previously stated, integrated circuit assembly 100 supports agents (e.g., CPUs 222, GPUs 224, and peripherals 226, such as audio devices, displays, etc.) that read data from and write data to a memory coupled to integrated circuit assembly 100. These agents may include buffers that are used to temporarily store data locally in order to avoid underrun or overflow due to memory bandwidth and latency variations. In addition, the fabric that enables communications between the agents and the memory may support various QOS levels to ensure that the agents receive the memory access bandwidth and latency that they require. Some latency events 525, however, may occur that cause the memory or fabric to become unavailable for some period of time. For example, a change to the frequency of a memory may cause the memory to be temporarily unavailable. As a result, it may be desirable to ensure that the agents have enough space/data in their buffers to survive the periods of unavailability without overflow/underrun.

During operation, in various embodiments, agents on dies 110A-B broadcast how much unavailability/latency that they can tolerate for reads and writes. This information is provided by the agents to their local SOC secondary PMGR 245 in the form of read and write tolerance values 510. A read tolerance value 510 may indicate an estimated amount of time that it would take the corresponding agent to drain its buffer of data without an inflow of data into the buffer from, e.g., a memory—that is, an estimated amount of time before underrun. A write tolerance value 510 may indicate an estimated amount of time that it would take that agent to fill its buffer with data without data flowing out from the buffer—that is, an estimated amount of time before overflow. In various embodiments, SOC secondary PMGRs 245 calculate the minimum read and write unavailability tolerance of its agents based on the read and write tolerance values 510 that its receives. This information is then provided by SOC secondary PMGRs 245 to SOC primary PMGR 240 in the form of minimum read and write tolerance values 520. In various embodiments, SOC primary PMGR 240 calculates the minimum read and write unavailability tolerance between all dies 110 based on the minimum read and write tolerance values 520 that its receives. In some cases, SOC primary PMGR 240 may provide the calculated information to SOC secondary PMGRs 245.

When a latency event 525 is to occur, in some embodiments, SOC primary PMGR 240 receives an indication (e.g., detects a signal) from a master global timer (not illustrated). SOC primary PMGR 240 may calculate latency event minimum read and write tolerance values 530 that are sufficient for surviving the latency event 525 without overflow/underrun. SOC primary PMGR 240 may determine whether the calculated minimum read and write tolerance values for all dies 110 are sufficient for the latency event 525 in view of the calculated latency event minimum read and write tolerance values 530. If they are not sufficient, SOC primary PMGR 240 may broadcast the determined latency event minimum read and write tolerance values 530 to SOC secondary PMGRs 245. In some embodiments, SOC primary PMGR 240 broadcasts those values 530 without performing a comparison—that is, after calculating those values 530, they may be sent out independent of the current tolerance of the agents of dies 110. The values may be sent as a part of a request to SOC secondary PMGRs 245 to transition components of dies 110 from a first performance state to a second performance state. In various embodiments, SOC primary PMGR 240 delays the latency event 525 until most or all agents in all dies 110 are able to tolerate the target latency.

While the latency event 525 is being delayed, the agents in dies 110 are provided with the latency event minimum read and write tolerance values 530 so that they may increase their latency tolerance (e.g., by storing more data in their buffer or by flushing data out). Thereafter, the agents may broadcast their new read and write tolerance values 510 to their SOC secondary PMGR 245. SOC secondary PMGRs 245 may notify SOC primary PMGR 240 that the latency event 525 can be tolerated after they have determined that their agents can withstand the event based on new read and write tolerance values 510. Once the latency event 525 can be survived, in various embodiments, SOC primary PMGR 240 stops delaying the latency event 525 and allows it to occur.

Figure 6:
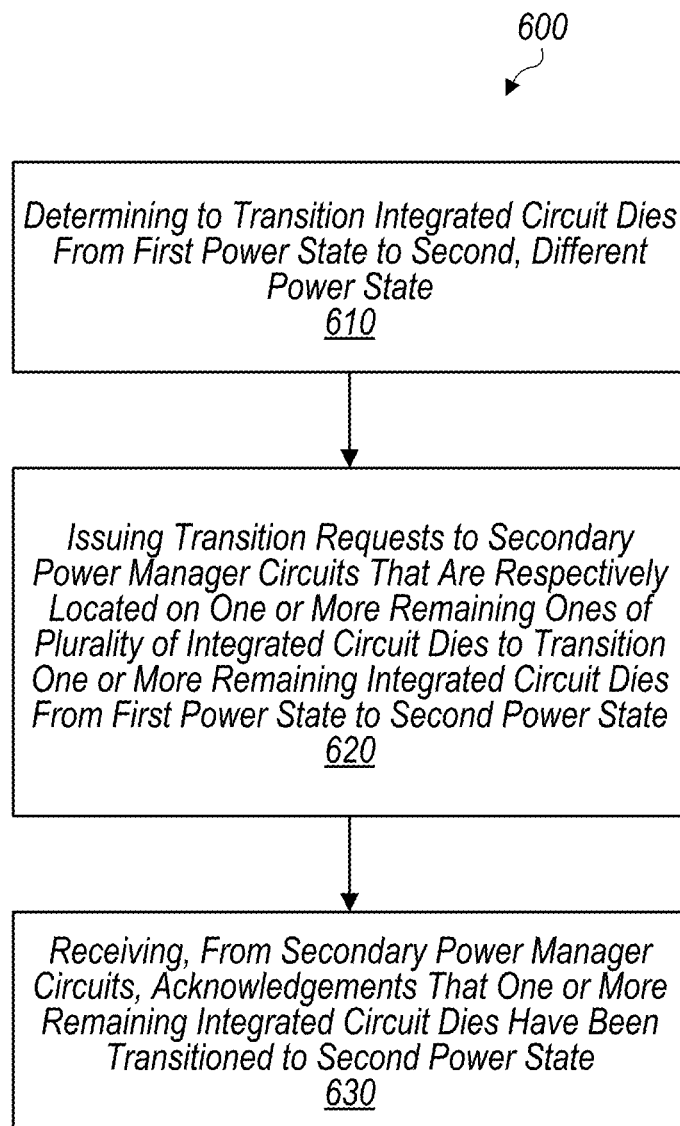
FIG. 6 is a flow diagram illustrating example method relating to transitioning integrated circuit dies from a first power state to a second power state, according to some embodiments.

Turning now to FIG. 6, a flow diagram of a method 600 is shown. Method 600 is one embodiment of a method performed by a primary power manager circuit (e.g., a primary PMGR 120) to transition an integrated circuit assembly (e.g., an integrated circuit assembly 100) from a first state (e.g., suspend state 340) to a second state (e.g., memory state 330). Method 600 may be performed in response to the primary power manager circuit receiving a wake-up request (e.g., a memory wake-up request 412). In some embodiments, method 600 includes more or less steps than shown. For example, method 600 may include a step in which the primary power manager circuit receives the wake-up request.

Method 600 begins in step 610 with the primary power manager circuit determining to transition the integrated circuit assembly from the first power state to the second, different power state. The first power state may correspond to a state in which a memory coupled to a first integrated circuit die (e.g., integrated circuit dies 110A) is inaccessible to components (e.g., peripherals 226) of other integrated circuit dies (e.g., integrated circuit dies 110B) of the integrated circuit. The second power state may be a state in which the memory is accessible to the components.

In step 620, the primary power manager circuit issues transition requests (e.g., transition requests 125) to secondary power manager circuits that are respectively located (a one-to-one mapping between secondary power manager circuits and dies) on one or more remaining integrated circuit dies of the integrated circuit assembly to transition the one or more remaining integrated circuit dies from the first power state to the second power state. Transitioning the integrated circuit dies from the first power state to the second power state may include transitioning through a set of synchronization points (e.g., synchronization points 350) between the first and second power states. The primary power manager circuit may receive synchronization acknowledgements (e.g., a D2D synchronization acknowledgement 426) that a first synchronization point of the set of synchronization points has been reached. As such, the primary power manager circuit may determine that a threshold number of the integrated circuit dies (e.g., all) of the integrated circuit assembly have reached the first synchronization point based on the received synchronization acknowledgements. The primary power manager circuit may issue, to the secondary power manager circuits, requests to proceed to transition the one or more remaining integrated circuit dies to a second, subsequent synchronization point of the set of synchronization points.

In step 630, the primary power manager circuit receives, from the secondary power manager circuits, acknowledgements (e.g., transition acknowledgement 135) that the one or more remaining integrated circuit dies have been transitioned to the second power state. In various embodiments, the primary power manager circuit may detect an event to be performed with respect to a memory associated with the integrated circuit. The primary power manager circuit may determine read and write tolerance values (e.g., latency event minimum read and write tolerance values 530) for the event. The primary power manager circuit may send the read and write tolerance values to the secondary power manager circuits. The primary power manager circuit may block the event until acknowledgments are received from the secondary power manager circuits that a set of associated peripherals circuits can tolerate latencies corresponding to the read and write tolerance values.

Figure 7:
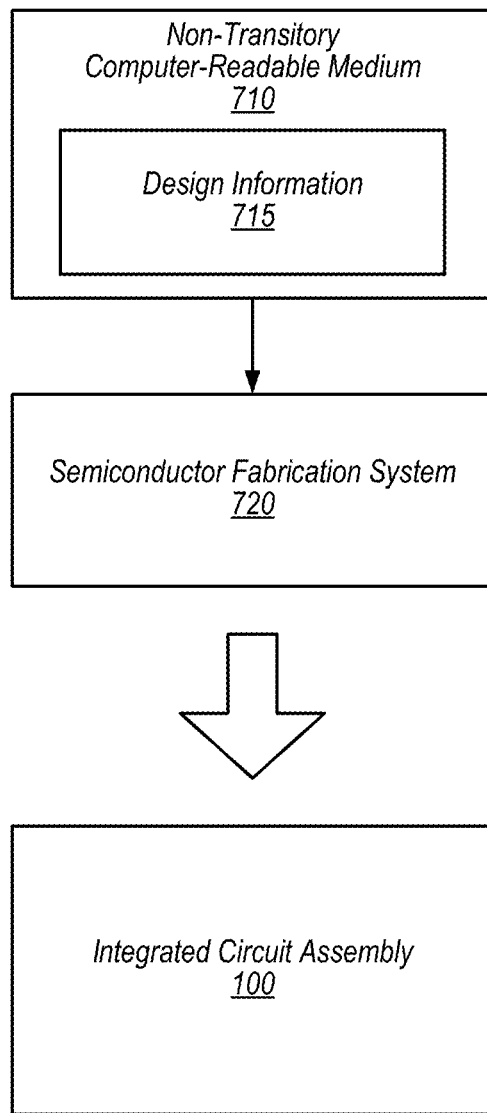
FIG. 7 is a block diagram illustrating an example process of fabricating at least a portion of an integrated circuit assembly, according to some embodiments.

Turning now to FIG. 7, a block diagram illustrating an example process of fabricating an integrated circuit assembly 100 is shown. The illustrated embodiment includes a non-transitory computer-readable medium 710 (which includes design information 715), a semiconductor fabrication system 720, and a resulting fabricated integrated circuit assembly 100. In some embodiments, integrated circuit assembly 100 includes at least two integrated circuit dies 110 that are coupled together. Integrated circuit assembly 100 may further additionally or alternatively includes other circuits such as a wireless network circuit. In the illustrated embodiment, semiconductor fabrication system 720 is configured to process design information 715 to fabricate integrated circuit assembly 100.

Non-transitory computer-readable medium 710 may include any of various appropriate types of memory devices or storage devices. For example, non-transitory computer-readable medium 710 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 710 may include two or more memory mediums, which may reside in different locations (e.g., in different computer systems that are connected over a network).

Design information 715 may be specified using any of various appropriate computer languages, including hardware description languages such as, without limitation: VHDL, Verilog, SystemC, System Verilog, RHDL, M, MyHDL, etc. Design information 715 may be usable by semiconductor fabrication system 720 to fabricate at least a portion of integrated circuit assembly 100. The format of design information 715 may be recognized by at least one semiconductor fabrication system 720. In some embodiments, design information 715 may also include one or more cell libraries, which specify the synthesis and/or layout of integrated circuit assembly 100. In some embodiments, the design information is specified in whole or in part in the form of a netlist that specifies cell library elements and their connectivity. Design information 715, taken alone, may or may not include sufficient information for fabrication of a corresponding integrated circuit assembly (e.g., integrated circuit assembly 100). For example, design information 715 may specify circuit elements to be fabricated but not their physical layout. In this case, design information 715 may be combined with layout information to fabricate the specified integrated circuit.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit assembly 100 is configured to operate according to a circuit design specified by design information 715, which may include performing any of the functionality described herein. For example, integrated circuit assembly 100 may include any of various elements described with reference to FIGS. 1-6. Furthermore, integrated circuit assembly 100 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit assembly 100 is performed. Design information 715 may be generated using one or more computer systems and stored in non-transitory computer-readable medium 710. The method may conclude when design information 715 is sent to semiconductor fabrication system 720 or prior to design information 715 being sent to semiconductor fabrication system 720. Accordingly, in some embodiments, the method may not include actions performed by semiconductor fabrication system 720. Design information 715 may be sent to semiconductor fabrication system 720 in a variety of ways. For example, design information 715 may be transmitted (e.g., via a transmission medium such as the Internet) from non-transitory computer-readable medium 710 to semiconductor fabrication system 720 (e.g., directly or indirectly). As another example, non-transitory computer-readable medium 710 may be sent to semiconductor fabrication system 720. In response to the method of initiating fabrication, semiconductor fabrication system 720 may fabricate integrated circuit assembly 100 as discussed above.

Figure 8:
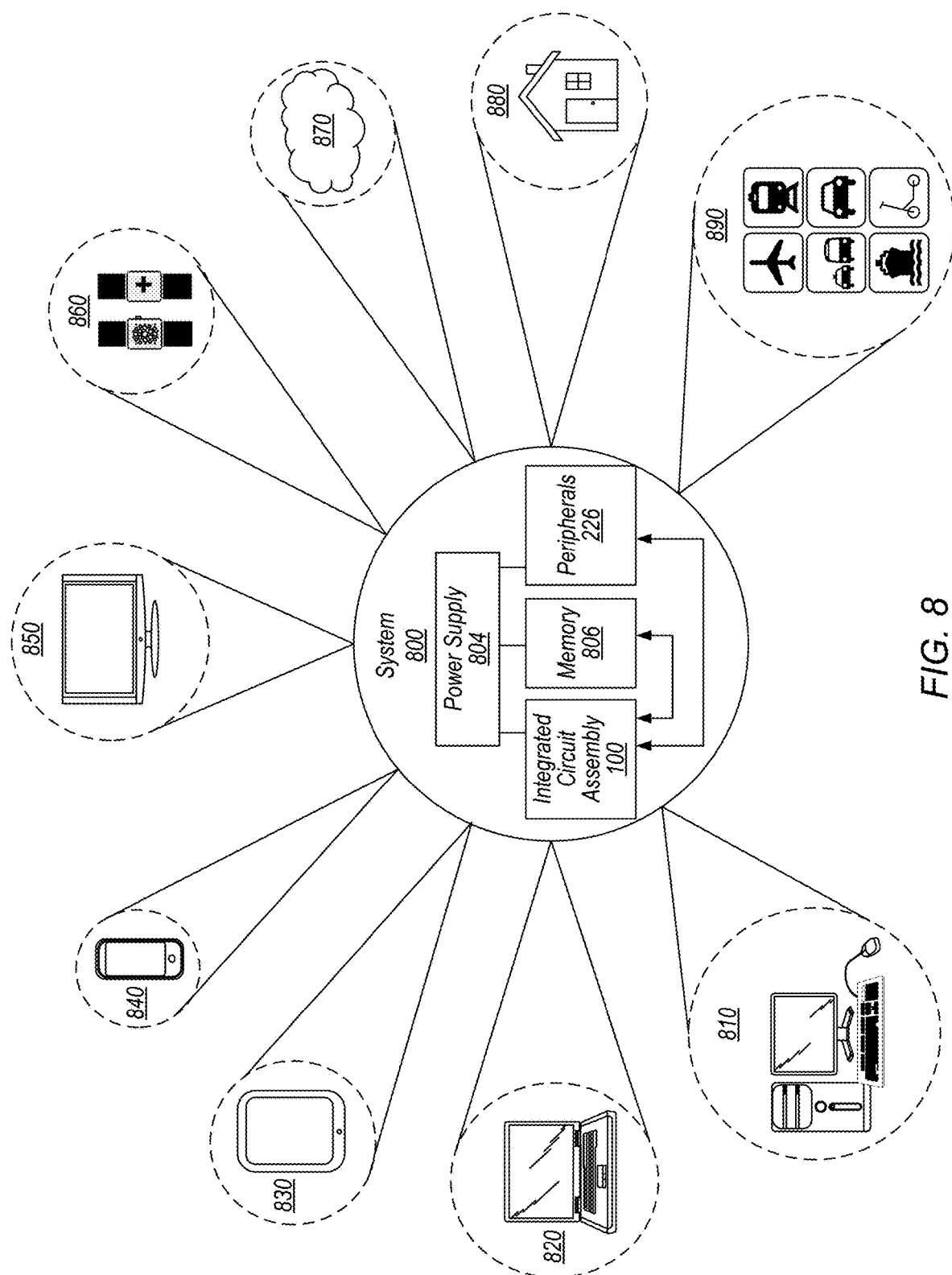
FIG. 8 is a block diagram illustrating an example integrated circuit assembly that is usable within various types of systems, according to some embodiments.

Turning next to FIG. 8, a block diagram of one embodiment of a system 800 is shown that may incorporate and/or otherwise utilize the methods and mechanisms described herein. In the illustrated embodiment, the system 800 includes at least one instance of an integrated circuit assembly 100 that is coupled to external memory 806, peripherals 226, and a power supply 804. Power supply 804 is also provided which supplies the supply voltages to integrated circuit assembly 100 as well as one or more supply voltages to the memory 806 and/or the peripherals 226. In various embodiments, power supply 804 represents a battery (e.g., a rechargeable battery in a smart phone, laptop or tablet computer, or other device). In some embodiments, more than one instance of integrated circuit assembly 100 is included (and more than one external memory 806 is included as well).

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (e.g., remotely located hardware and/or software resources). Still further, system 800 may be utilized in one or more devices of a home 880 other than those previously mentioned. For example, appliances within home 880 may monitor and detect conditions that warrant attention. For example, various devices within home 880 (e.g., a refrigerator, a cooling system, etc.) may monitor the status of the device and provide an alert to the homeowner (or, for example, a repair facility) should a particular event be detected. Alternatively, a thermostat may monitor the temperature in home 880 and may automate adjustments to a heating/cooling system based on a history of responses to various conditions by the homeowner. Also illustrated in FIG. 8 is the application of system 800 to various modes of transportation 890. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A system, comprising:
a plurality of integrated circuit dies coupled together, wherein the plurality of integrated circuit dies include a first and a second integrated circuit die that include respective processor circuitry, wherein the second integrated circuit die is associated with a set of agent circuits;
wherein the first integrated circuit die is configured to:
 detect a latency event to be performed that affects an availability of a memory associated with the plurality of integrated circuit dies;
 determine read and write tolerance values for the latency event;
 send the read and write tolerance values to the second integrated circuit die; and
 block the latency event until at least an acknowledgment is received from the second integrated circuit die that the set of agent circuits is able to tolerate latencies corresponding to the read and write tolerance values.

2. The system of claim 1, wherein the second integrated circuit die is configured to:
send the read and write tolerance values to the set of agent circuits;
based on tolerance information received from the set of agent circuits, make a determination that the set of agent circuits is able to tolerate the latencies; and
provide the acknowledgment to the first integrated circuit die in response to the determination.

3. The system of claim 1, wherein a particular agent circuit of the set of agent circuits includes a buffer and is configured to:
receive a read tolerance value of the read and write tolerance values; and
based on the read tolerance value, store a sufficient amount of data in the buffer to prevent an underflow of the buffer due to the latency event.

4. The system of claim 1, wherein a particular agent circuit of the set of agent circuits includes a buffer and is configured to:
receive a write tolerance value of the read and write tolerance values; and based on the write tolerance value, evict a sufficient amount of data from the buffer to prevent an overflow of the buffer due to the latency event.

5. The system of claim 1, wherein a particular agent circuit of the set of agent circuits is configured to send, to the second integrated circuit die, a minimum read tolerance value that indicates a latency for reads that can be tolerated by the particular agent circuit and a minimum write tolerance value that indicates a latency for writes that can be tolerated by the particular agent circuit.

6. The system of claim 1, wherein the second integrated circuit die is configured to:
  receive minimum read and write tolerance values from ones of the set of agent circuits;
  determine minimum die read and write tolerance values for the second integrated circuit die based on the minimum read and write tolerance values received from the agent circuits; and
  send the minimum die read and write tolerance values to the first integrated circuit die.

7. The system of claim 6, wherein the first integrated circuit die is configured to:
  determine minimum system read and write tolerance values based on the minimum die read and write tolerance values of the second integrated circuit die; and
  send the read and write tolerance values to the second integrated circuit die in response to a determination that the minimum system read and write tolerance values does not satisfy the read and write tolerance values determined for the latency event.

8. The system of claim 7, wherein the first integrated circuit die is configured to:
  receive minimum die read and write tolerance values from a third integrated circuit die of the plurality of integrated circuit dies, wherein the minimum system read and write tolerance values are determined based on the minimum die read and write tolerance values of the third integrated circuit die.

9. The system of claim 1, wherein the first integrated circuit die includes a first power manager circuit that is configured to synchronize a power state change of the plurality of integrated circuit dies from a first power state to a second power state, and wherein the first power manager circuit is further configured to:
  determine the read and write tolerance values;
  send the read and write tolerance value to a second power manager circuit included in the second integrated circuit die; and
  block the latency event until at least the acknowledgment is received.

10. The system of claim 1, wherein the first and second integrated circuit dies are a first and a second system-on-a-chip respectively that include at least a central processing unit and a graphics processing unit.

11. A method, comprising:
  detecting, by a first integrated circuit die of a plurality of integrated circuit dies coupled together, a latency event to be performed that affects an availability of a memory associated with the plurality of integrated circuit dies;
  determining, by the first integrated circuit die, read and write tolerance values to prevent instances of underflow and overflow due to the latency event;
  sending, by the first integrated circuit die, the read and write tolerance values to a second integrated circuit die of the plurality of integrated circuit dies, wherein the second integrated circuit die is associated with a set of agent circuits; and
  blocking, by the first integrated circuit die, the latency event until at least an acknowledgment is received from the second integrated circuit die that the set of agent circuits is able to tolerate latencies corresponding to the read and write tolerance values.

12. The method of claim 11, further comprising:
  receiving, by the first integrated circuit die, minimum die read and write tolerance values associated with the second integrated circuit die; and
  determining, by the first integrated circuit die, minimum system read and write tolerance values based on the minimum die read and write tolerance values, wherein the sending is performed in response to a determination that the minimum system read and write tolerance values does not satisfy the read and write tolerance values determined for the latency event.

13. The method of claim 11, wherein the method is performed by a power manager circuit included in the first integrated circuit die, wherein the power manager circuit is configured to transition the first integrated circuit die between power states.

14. The method of claim 13, further comprising:
  synchronizing, by the power manager circuit, a power state change of the plurality of integrated circuit dies from a first power state to a second power state, wherein the synchronizing includes the power manager circuit issuing, to a power manager circuit in included the second integrated circuit die, a request to transition the second integrated circuit die from the first power state to the second power state.

15. The method of claim 11, wherein the first and second integrated circuit dies are configured as a single system in which the existence of the first and second integrated circuit dies is hidden to software routines.

16. The method of claim 11, wherein the latency event involves a change to a frequency of the memory.

17. The method of claim 11, wherein the set of agent circuits includes a peripheral circuit.

18. A non-transitory computer readable medium having stored thereon design information that specifies a circuit design in a format recognized by a fabrication system that is configured to use the design information to fabricate an integrated circuit assembly that comprises:
  a plurality of integrated circuit dies coupled together, wherein the plurality of integrated circuit dies include a first and a second integrated circuit die that include respective processor circuitry, wherein the second integrated circuit die is associated with a set of peripheral circuits, and wherein the first integrated circuit includes a first power manager circuit;
  wherein the first power manager circuit is configured to:
    detect a latency event to be performed that affects an availability of a memory associated with the plurality of integrated circuit dies;
    determine read and write tolerance values for the latency event;
    send the read and write tolerance values to the second integrated circuit die; and
    block the latency event until at least an acknowledgment is received from the second integrated circuit die that the set of peripheral circuits is able to tolerate latencies corresponding to the read and write tolerance values.

19. The non-transitory computer readable medium of claim 18, wherein the second integrated circuit die includes a second power manager circuit that is configured to:
- send the read and write tolerance values to the set of peripheral circuits;
- determine that the set of peripheral circuits is able to tolerate the latencies based on tolerance information received from the set of peripheral circuits; and
- provide the acknowledgment to the first power manager circuit.

20. The non-transitory computer readable medium of claim 18, wherein the first and second integrated circuit dies are copies of each other.

* * * * *